Oct. 18, 1938.   B. SPERO   2,133,585

LENS

Filed May 21, 1936

Inventor
Bernard Spero

Patented Oct. 18, 1938

2,133,585

UNITED STATES PATENT OFFICE 2,133,585

LENS

Bernard Spero, Chicago, Ill.

Application May 21, 1936, Serial No. 81,039

3 Claims. (Cl. 88—54)

This invention relates to improvements in lenses for eyeglasses, spectacles, and the like; and to a method of obtaining binocular vision after the removal of the crystalline lens of an eye.

Heretofore it has been practically impossible to fit an individual with eyeglasses or spectacles to restore binocular vision after the removal of an opacity of the crystalline lens or of its capsules, such as is commonly known as a cataract of the eye. Such a cataract operation usually affects the crystalline lens of the eye to such an extent as to practically destroy the sight of the eye through the inability of the eye to focus light on the retina and form a proper image of objects in the field of view.

Strong convex lenses have been prescribed to take the place of the crystalline lens after it has been removed and the patient has thereby been able to obtain some degree of vision; but the size of the image recorded on the retina of the eye is larger than the corresponding image recorded on the retina of the other eye. Hence, prior to my invention here concerned, never has such a patient been able to obtain proper binocular vision. It is to overcome this difficulty that the present invention was devised.

The main objects of this invention are to provide an improved type of lens for restoring binocular vision when lost through damage to and operation upon the natural eye; to provide a lens of the character described having two separately spaced lenses; to provide a unitary lens of the character described having a plano-concave front lens and a double or plano-convex back lens; to provide, as an article of manufacture, a lens which may be substituted externally for the crystalline lens of the eye when the crystalline lens has been removed through an operation; to provide a lens which will cause an image to be recorded on the retina of one eye, after the crystalline lens has been removed, of the same height and depth as the image recorded on the retina of the other unoperated or normal eye; to provide a lens of the character described of all glass construction; to provide an improved method of obtaining binocular vision after the crystalline lens has been removed from an eye; to provide an eye glass or spectacles adapted to compensate for loss of a natural eye lens and to provide a lens of the character described which is simple in construction and use and easy to manufacture and install.

An illustrative embodiment of this invention is shown in the accompanying drawing, in which.

Figure 1:
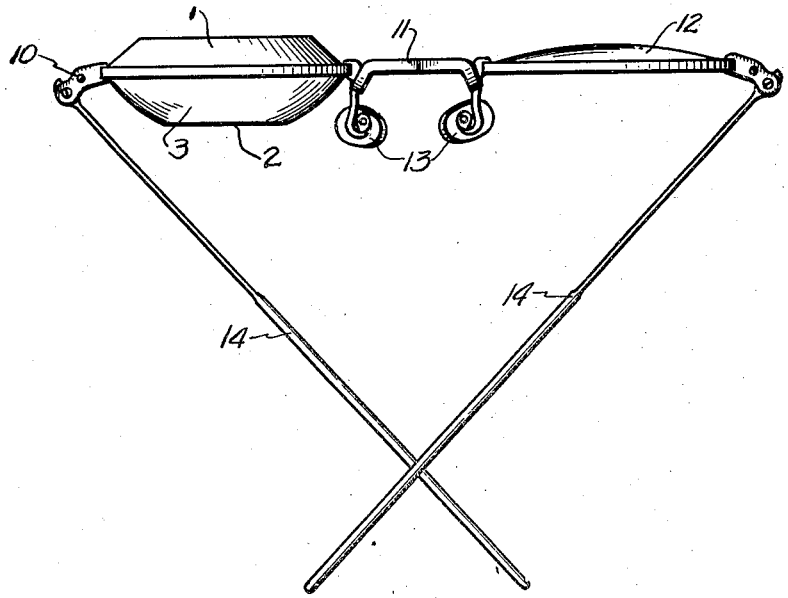
Figure 1 is a top plan view of a pair of glasses in which the present invention is embodied.
Figure 2:
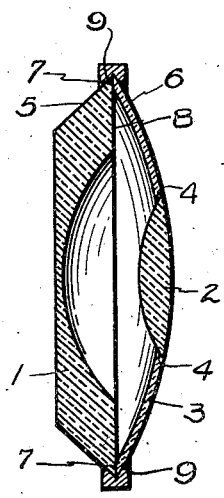
Fig. 2 is a vertical sectional view taken through the center of my improved lens.

Referring in detail to the drawing, my improved lens construction comprises a strong plano-concave front diverging lens 1 and a double convex back converging lens 2 cemented into the wall of a bowl-shaped shell 3, as at 4. The marginal diameters of the lens 1 and shell 3 are identical and the outer edges 5 and 6 thereof are beveled at such an angle that when the inner face edges 7 and 8 of the shell 3 and lens 1 are placed together, as shown in Fig. 2, the joint will form an angle substantially identical with the angle of a resilient grooved rim 9 of an ordinary spectacle frame and will be held firmly in place therein and together by the screw 10.

As shown, the shell 3 is so formed and curved that the distance between the inner surface of the convex lens 2 and the dished-out surface of the concave lens 1 is approximately 9 mm. at every point.

The frame of the spectacles is of the usual type and comprises, in addition to my improved lens construction, the usual bridge 11, normal lens 12 for the unoperated eye, nose pieces 13 and temple pieces 14.

Ordinarily after the crystalline lens of the eye has been removed, the patient is fitted, in front of his eye, by an optician, with a double or plano-convex converging lens having the necessary power of cataract correction which is determined and prescribed by an experienced oculist. This lens usually enables vision but due to the fact that the image is focused thus through a strong lens and the lens is spaced away from the cornea of the eye, the image recorded on the retina of the operated eye is not identical in size with the similar image recorded on the retina of the unoperated eye. The image recorded on the retina of the operated eye is larger than the image recorded on the retina of the unoperated eye. The patient therefore does not have coordinate or proper binocular vision.

To obtain proper binocular vision, the patient is first fitted in front of his eye with a strong convex lens as described above, but this lens is not used in my apparatus or method other than as a means for determining the focal length to obtain vision. Having found the focal length to obtain vision, I then produce and substitute for this prescribed lens a convex lens of substantially double the diopters of the prescribed lens and which, of course, has a much shorter focal length; but I incorporate in this new lens the necessary correction characteristics of the first prescribed lens. A plano-concave lens is then placed in front of and at a relatively short distance away from the new convex lens. This concave lens is of sufficient minus power, when taking in consideration a predetermined spacing between the two lenses, to cause the focal length of the combination of the two lenses to be substantially identical with the focal length of the first prescribed lens.

For the purposes of illustration; if the first perscribed lens is +13.5 diopters, then the convex lens I would produce would be of +32 diopters and the concave diverging lens would be a minus 20, the distance between the two lenses being predetermined at about 9 mm.; thereby bringing the combination of lenses to 13.5 diopters. These values represent mutually dependant variable easily determinable from any one factor or variable.

The patient with this combination of lenses is now able to obtain perfect binocular vision.

It will be understood that the manner of fastening the convex lens 2 to the shell 3 may be accomplished in many different ways; that the shell and convex lens may be ground from one piece of glass; and that the shell may be made of any kind of material, such as metal, Celluloid, etc.

Although but one specific embodiment of this invention has been herein shown and described, it will be understood that some of the details of the construction shown may be altered or omitted without departing from the spirit of this invention as defined by the following claims.

I claim:

1. As an article of manufacture for obtaining binocular vision after the removal of the crystalline lens from one eye, a device comprising a convex converging back lens arranged to be positioned adjacent the eyeball of about one-half the diameter of the usual spectacle lens, a plano concave diverging front lens of the usual spectacle diameter, an all-glass shell of the same diameter as said concave lens and having its medial portion apertured for the reception and mounting of said convex lens, said shell being formed to axially space said lenses from each other whereby said lenses are positioned in fixed non-movable relationship to each other and at a predetermined distance which is effectively relative to their respective focal lengths, and means for securing said shell and concave lens together in visually operative relationship, said lens assembly being thus so constructed and arranged as to cause an image to be thrown on the retina of an operated eye which is of the same height and depth as the same images thrown naturally on the retina of a normal eye.

2. In an article of manufacture for obtaining binocular vision after removal of the crystalline lens from an eye, a lens system comprising a relatively small converging back lens having a convex front surface and of a predetermined power for positioning adjacent the eye, a transparent dished annular shell, the said lens being disposed centrally of the annular shell, the diameter of the latter of which is substantially that of a conventional spectacle lens, a diverging front lens of a predetermined power haivng a concave rear surface, the diameter of which is substantially that of a conventional spectacle lens, means for securing said shell and diverging front lens together in coaxial spaced relationship with the convex surface of the back lens spaced from and facing the concave rear surface of the front lens, and said lens combination having a total effective power as required to provide a reduced image of a predetermined size for said eye.

3. In an article of manufacture for obtaining binocular vision after removal of the crystalline lens from an eye, a lens system comprising a relatively small double convex back lens of a predetermined power for positioning adjacent the eye, a transparent concave shell, the said lens being disposed centrally of the shell, the diameter of the latter of which is substantially that of a conventional spectacle lens, a diverging front lens of a predetermined power having a concave rear surface, the diameter of which is substantially that of a conventional spectacle lens, means for securing said shell and diverging front lens together at their peripheries and in coaxial relationship with the double convex back lens spaced from and facing the concave rear surface of the front lens, and said lens combination having a total effective power as required to provide a reduced image of a predetermined size for said eye.

BERNARD SPERO.

CERTIFICATE OF CORRECTION.

Patent No. 2,133,585.　　　　　　　　　　　　　　　October 18, 1938.

BERNARD SPERO.

It is hereby certified that error appears in the printed specification of the above numbered patent requiring correction as follows: Page 2, first column, line 19-20, for "variable" read variables; lines 41 and 42, claim 1, strike out the words "arranged to be positioned adjacent the eyeball" and insert the same after "lens" and before the comma in line 43, same claim, and second column, line 9, same claim 1, for "images" read image; line 21, claim 2, for "haivng" read having; and that the said Letters Patent should be read with this correction therein that the same may conform to the record of the case in the Patent Office.

Signed and sealed this 6th day of December, A. D. 1938.

Henry Van Arsdale (Seal)　　　　　　　　　　　　　　　　　Acting Commissioner of Patents.